United States Patent
Hughes

[15] 3,665,692
[45] May 30, 1972

[54] ROTARY MOWER HOLDER WITH EXPENDABLE BLADES

[72] Inventor: Benjamin F. Hughes, Route 1, Morris, Ala. 35116

[22] Filed: Jan. 2, 1970

[21] Appl. No.: 263

[52] U.S. Cl. ................................................56/295
[51] Int. Cl. ..............................................A01d 55/18
[58] Field of Search.........................................56/295

[56] References Cited

UNITED STATES PATENTS

| | | | |
|---|---|---|---|
| 2,869,311 | 1/1959 | Beeston, Jr. | 56/295 |
| 2,924,059 | 2/1960 | Beeston, Jr. | 56/295 |
| 2,932,147 | 4/1960 | Beeston, Jr. | 56/295 |
| 3,097,468 | 7/1963 | Johnson | 56/295 |
| 3,327,460 | 6/1967 | Blackstone | 56/295 |
| 3,388,540 | 6/1968 | Michaud | 56/295 |
| 3,474,608 | 10/1969 | Frick | 56/295 |

Primary Examiner—Louis G. Mancene
Assistant Examiner—J. N. Eskovitz
Attorney—Polachek & Saulsbury

[57] ABSTRACT

A blade and holder assembly for a power driven rotary type mower has a bar mountable on the shaft of the driving motor of the mower. Ends of the bar are bent on transverse axes to form flanges which define blade receiving channels with opposite end portions of the bar. Expendable blades have backs which removably engage in the channels. The blades are held in place by frictional engagement and centrifugal force of rotation of the bar. Supplementary retaining screws may be provided. Blades may have two cutting edges and may be reversible in the retaining flanges.

1 Claim, 37 Drawing Figures

Patented May 30, 1972
3,665,692
3 Sheets-Sheet 1
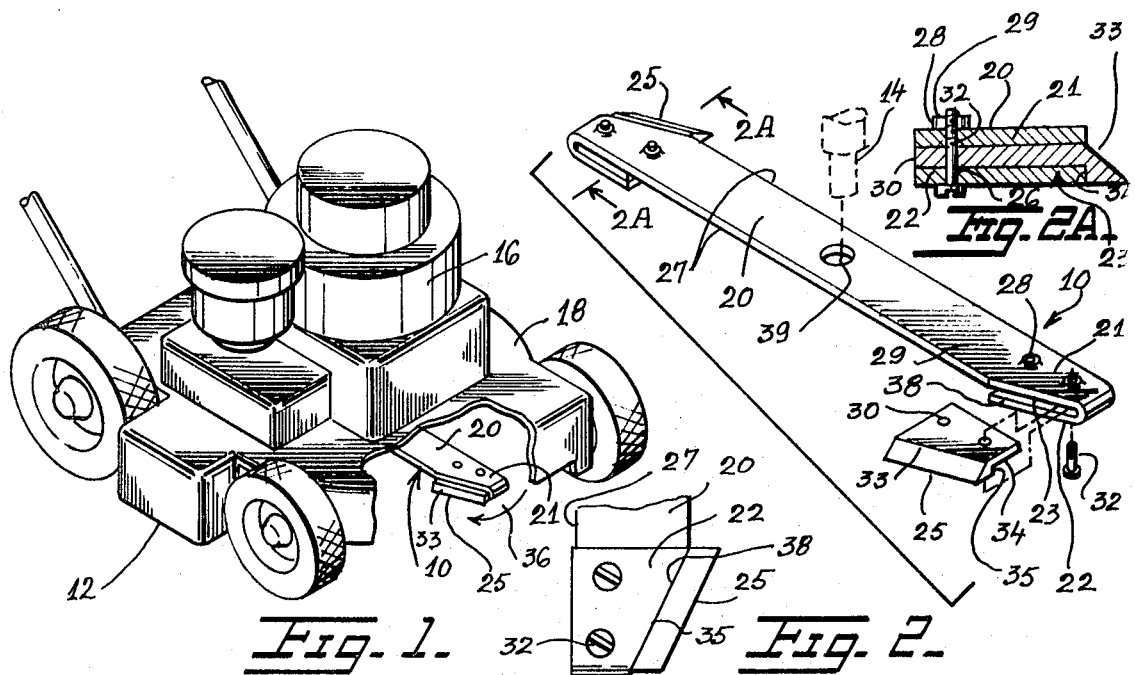
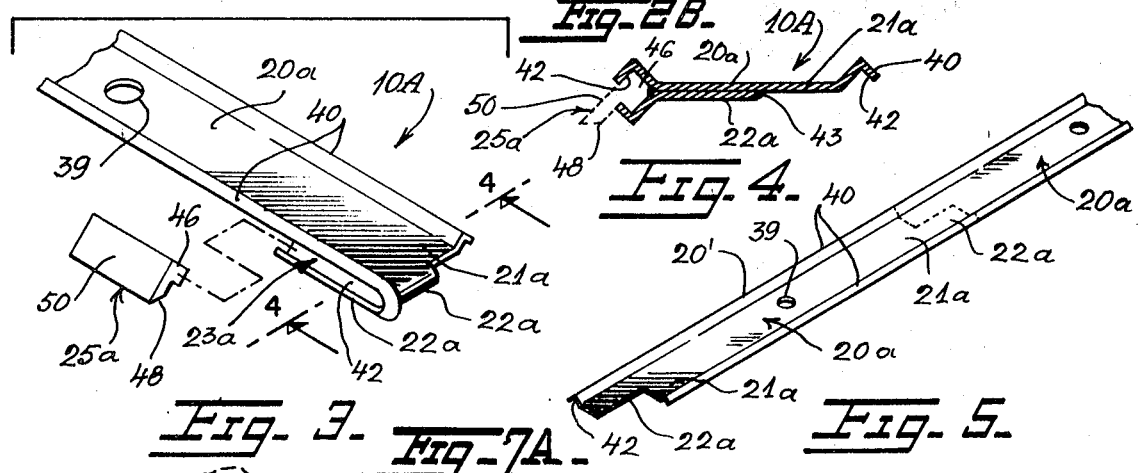
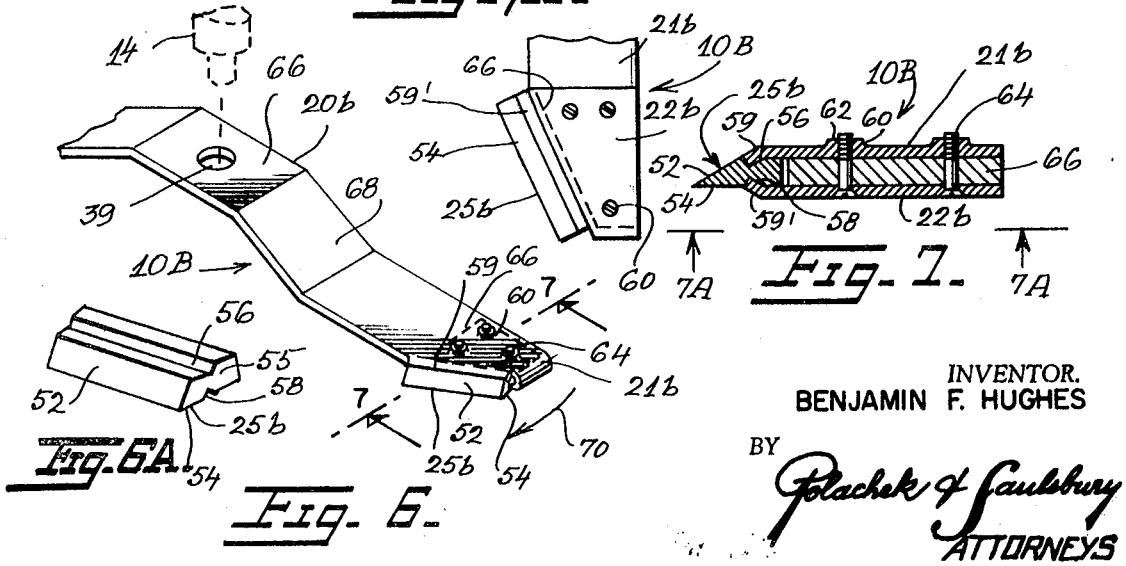
INVENTOR.
BENJAMIN F. HUGHES
BY Polachek & Saulsbury
ATTORNEYS Patented May 30, 1972
3,665,692
3 Sheets-Sheet 2
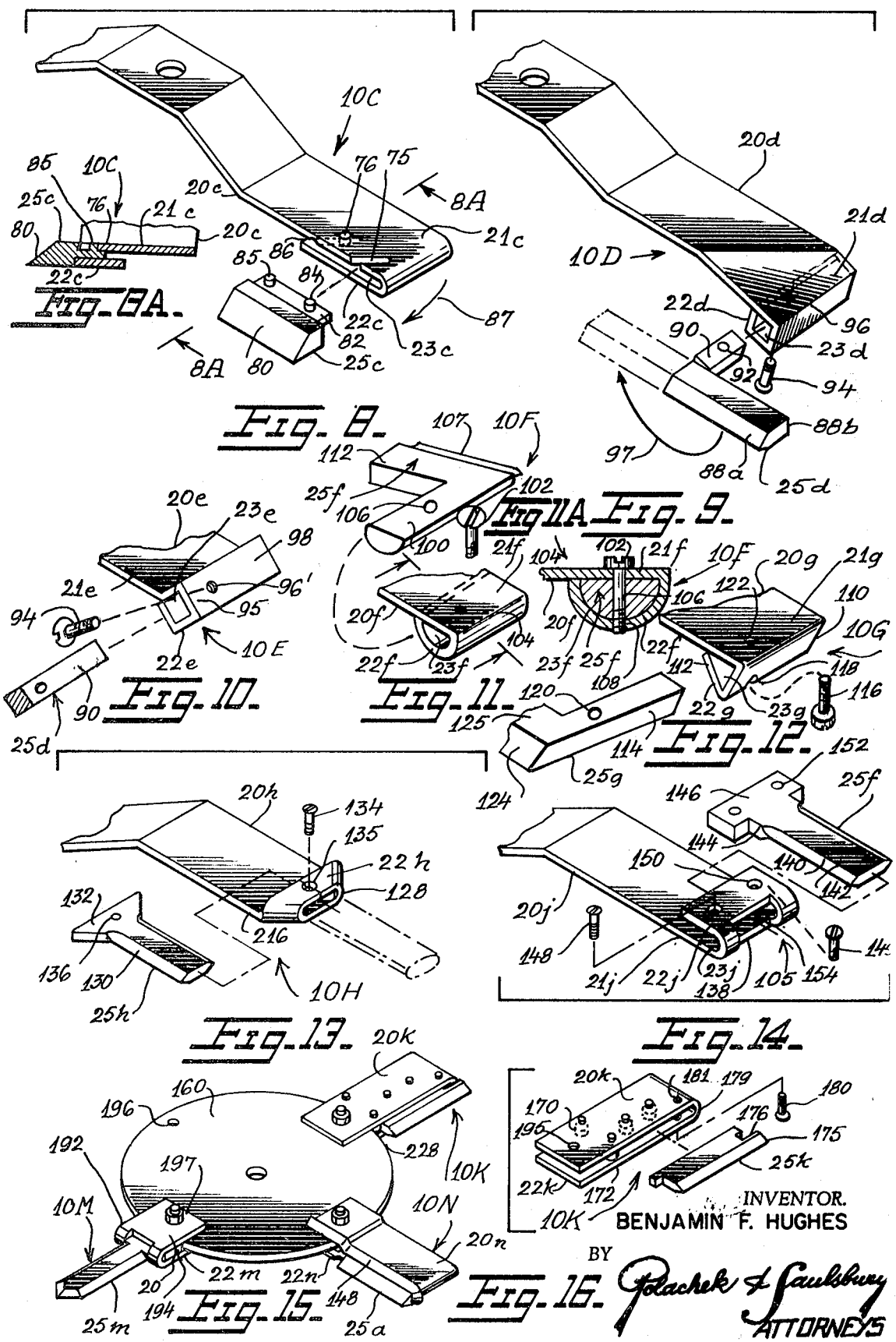
INVENTOR.
BENJAMIN F. HUGHES
BY
Polachek & Saulsbury
ATTORNEYS

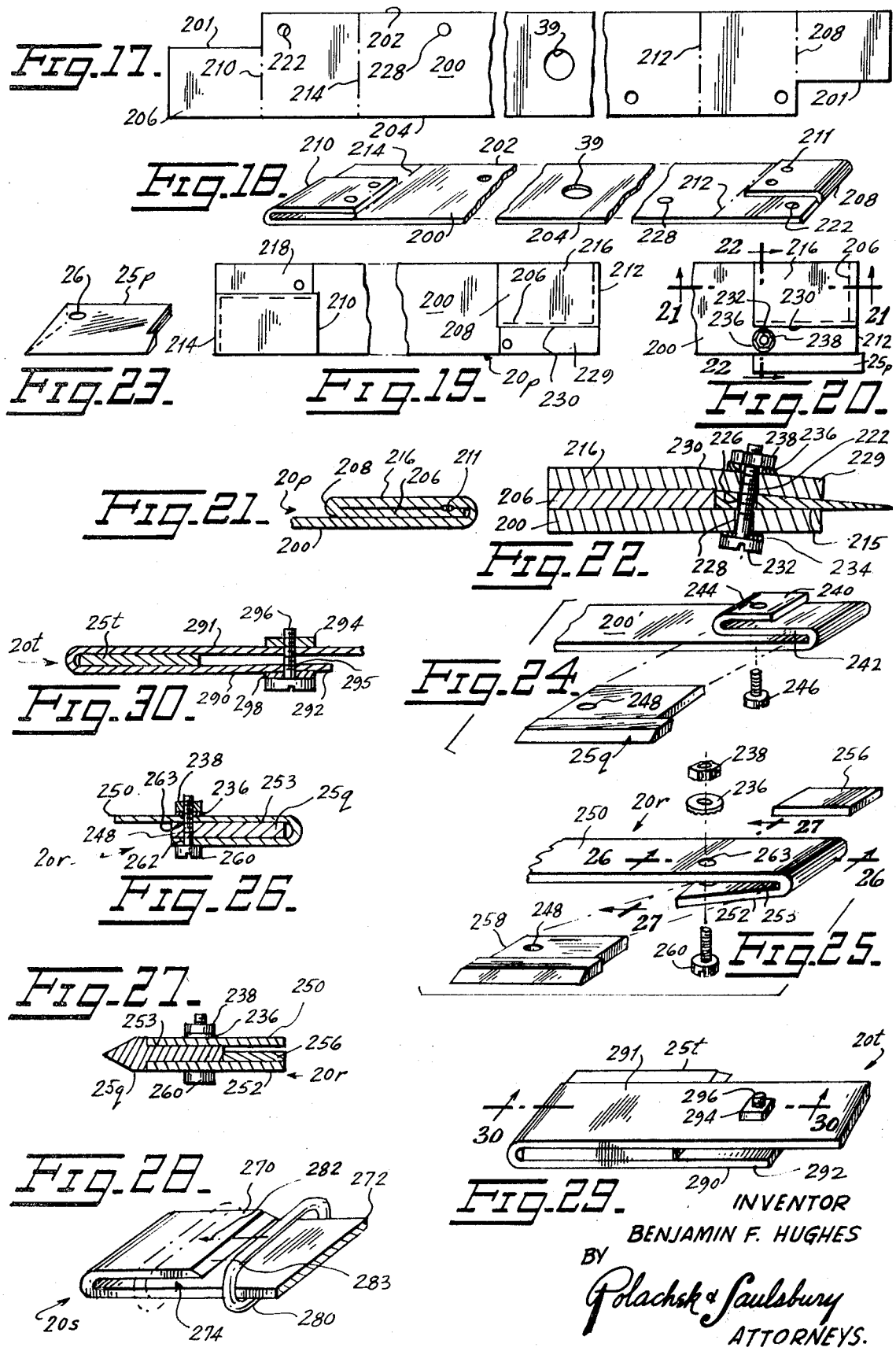

ROTARY MOWER HOLDER WITH EXPENDABLE BLADES

This invention relates to the art of rotary mower blades and more particularly concerns rotary blade assemblies in which blades are removable and expendable.

It has been known heretofore to provide rotary mower blades which are removable from the mower for resharpening. Since very few mower owners have proper blade sharpening equipment available to them, the blades must be given out to be sharpened. The cost of sharpening is often rather high and approaches the cost of the blades. Furthermore, the mower owner is inconvenienced by having to seek out a blade sharpening service and by having to take the time to deliver blades for sharpening and having to pick them up after sharpening. A typical blade assembly having a removable, resharpenable blade is described in U.S. Pat. No. 3,097,468.

It has further been proposed to provide rotary mower blade assemblies in which blades are removable and expendable, and do not require resharpening. Such throw-away blades are mounted in complex, multiple-art holders. Typical assemblies of this type are described in U.S. Pat. Nos. 2,932,147 and 3,388,540.

The present invention has a principal object to provide a blade assembly for a rotary mower, which includes expendable, throw-away cutting blades and novel means for attaching the blades to and for releasing the blades from a rotatable blade holder.

Another object is to provide a rotary mower blade assembly as described, wherein the removable blades will not become dislodged or displaced during operation of the mower.

Another object is to provide a blade assembly for a rotary mower that is economical to manufacture and yet is durable in construction to function in an efficient manner for a relatively long period of time.

According to the invention the blade assembly includes a blade holder made by folding or bending opposite ends of a bar to define contoured pockets into which correspondingly shaped blades are removably engageable. The blade holder will hold the blades in place and will not permit the blades to turn or yield if they encounter obstructions while doing heavy mowing. If the blades become dull or are broken, they can easily and quickly be replaced. The blades are inexpensive so that the cost of replacement is negligible.

The blade holder may have abutments defined by rivets, studs, welding and the like to hold the removable blades in place. The holder is so constructed that the removable blades will not vibrate during use. Other and further objects and advantages of the invention and further detailed features of construction will be explained in connection with the drawings, wherein:

FIG. 1 is a perspective view of a rotary type of power mower with a portion cut away to show part of a cutter blade assembly embodying the invention.

FIG. 2 is an enlarged perspective view partially exploded in form showing the blade assembly of FIG. 1.

FIG. 2A is an enlarged cross sectional view taken on line 2A–2A of FIG. 2.

FIG. 2B is an enlarged bottom plan view of one end of the blade assembly of FIG. 1.

FIG. 3 is a fragmentary exploded perspective view of another assembly of blade and holder.

FIG. 4 is a cross sectional view taken on line 4—4 of FIG. 3.

FIG. 5 is a fragmentary perspective view of a bar showing it at a stage in manufacture of the blade holder of FIGS. 3 and 4.

FIG. 6 is a perspective view of part of another assembly of blade and blade holder.

FIG. 6A is a perspective view of the blade employed in the assembly of FIG. 6.

FIG. 7 is an enlarged cross sectional view taken on line 7—7 of FIG. 6.

FIG. 7A is a fragmentary reduced bottom plan view taken on line 7A—7A of FIG. 7.

FIGS. 8 to 14 and 16 are exploded perspective views of other cutter blade and holder assemblies.

FIGS. 8A is a cross sectional view taken on line 8A—8A of FIG. 8, with the assembly shown completely assembled.

FIG. 11A is a cross section taken on line 11A—11A of FIG. 11.

FIG. 15 is a perspective view of a further assembly of blade holder and blades.

FIG. 17 is a plan view of a flat bar shown at a stage in the process of forming it into a cutter blade holder, parts of the bar being broken away.

FIG. 18 is a perspective view of the bar of FIG. 17 shown at a further stage in the forming process.

FIG. 19 is a plan view of a cutter blade holder formed by the process illustrated in FIGS. 17 and 18, parts of the bar being broken away.

FIG. 20 is a plan view of an end of the bar of FIG. 19, with a cutter blade mounted therein.

FIG. 21 and FIG. 22 are enlarged sectional views taken on lines 21—21 and 22—22 of FIG. 20.

FIG. 23 is a perspective view of the blade shown in FIGS. 20 and 21.

FIG. 24 is an exploded perspective view of one end of another blade holder and a cutter blade.

FIG. 25 is an exploded perspective view of a part of another blade holder, a blade, spacer and other parts.

FIG. 26 and FIG. 27 are enlarged sectional views taken on lines 26—26 and 27—27 of FIG. 25 and showing the spacer and blade assembled with the blade holder.

FIG. 28 and FIG. 29 are perspective views of parts of two further blade holders.

FIG. 30 is a sectional view taken on line 30—30 of FIG. 29.

Referring first to FIG. 1, there is shown a rotary blade and holder assembly 10 mounted in operating position in a rotary type of mower 12. A vertically disposed shaft 14 indicated by dotted lines in FIG. 2 extends from motor 16 below platform 18 in conventional manner. Assembly 10 is attached to shaft 14.

The blade and holder assembly 10 comprises a rigid bar 20 which is flat and straight between opposite ends. Flanges 22 are folded underneath the bar at opposite ends thereof and at opposite edges 27 of the bar. The flanges are trapezoidal in plan view as clearly shown in FIG. 2B. The end portions 21 of the bar are tapered in plan view as shown in FIGS. 1 and 2 to register with flanges 22. Narrow spaces 23 are defined between the flanges 22 and end portions 21 of the bar. Axially aligned holes 26 and 28 are formed in each flange 22 and bar end 21. Blades 25 are removably engaged in spaces 23. Each blade has two holes 30. Screws or bolts 32 extend through the axially aligned holes 26, 28 in the flanges 22 and bar ends 21 and through holes 30 in the blades. Holes 28 are formed by punching or striking a boss 29 outwardly of the bar and threading the inside of holes 28 to engage the free threaded end of the shank of each screw 32. Each blade has a sharp, beveled edge 33 and a recess 34 defining a back abutment 35.

In operation, bar 20 turns in the direction indicated by arrow 36 in FIG. 1. Abutment 35 is backed up by edge 38 of flange 22. Thus each blade 25 is held by two screws 32, by juxtaposition of abutment 35 to edge 38 and by frictional engagement of opposite sides of the blade between facing, spaced inner sides of flange 22 and bar end portion 21. Bar 20 has a central hole 39 which engages on the end of shaft 14.

FIGS. 3 and 4 show another assembly 10A including a blade holder 20a and blade 25a. The blade holder is a substantially flat bar with opposite edges 40 doubly bent to define a V-shaped channel 42. Flanges 22a at opposite end portions of the bar are bent under end portions 21a and are secured by welds 43. Channel 42 continues on the inner side of each flange 22 to oppose the channel in end portion 21a of the bar. Blade 25a has a rectangular back 46 which slides longitudinally into space 23a between channels 42 and abuts the bent end or bight 22a' at the other end of the flange. Edge 48 is beveled with respect to side 50 of the blade to define a cutting edge. The blade is frictionally engaged in space 23a between flange 22a and bar end portion 21a, and can be removed by sliding it rearwardly of the bar. During operation the blade tends to be thrown longitudinally outward to abut the inner side of bight 22a' so that the blade is in effect held more securely by centrifugal force. The doubly bent edges 40 reinforce the bar and help prevent flexing of the bar.

FIG. 5 shows a bar 20' of indefinite length in process of making bars 20a. Edges 40 are doubly bent to define channels 42. Spaced holes 39 are formed for engagement on shaft 15 of the motor of the mower. Flange 22a is stamped our cut out prior to folding it underneath end portion 21a of the bar. Flanges 22a are located at opposite edges 40 of each bar 20a.

FIGS. 6, 7 and 7A show another blade and holder assembly 10B. Blade 25b has a beveled edge 52 angularly disposed to bottom edge 54 to define the cutting edge of the blade; see FIGS. 6A and 7. The blade has a back 55. Two V-shaped channels or recesses 56, 58 are formed at opposite sides of the blade between back 55 and cutting edges 52, 54. Upper recess 56 receives bent edge 59 of bar end 21b. Lower recess 58 receives bent edge 59' of flange 22b. Bosses 60 are struck out and formed with threaded holes 62 to engage screws 64. A trapezoidal spacer 66 is interposed between each flange 22b and bar end portion 21b. Bar 20b has a central section 66 in which is hole 39 which receives the end of rotary shaft 14 of the mower motor. Bar end portion 21b is offset from the plane of central section 66 by an intermediate section 68 bent at opposite ends at obtuse angles to bar end portion 21b and central section 66. Flange 22b is trapezoidal in plan view as clearly shown in FIG. 7A. It will be apparent from an inspection of the drawing, that when bar 20b is turned in the direction indicated by arrow 70, blade 25b will be held securely in place and cannot vibrate in its mounting. Nevertheless the blade can be quickly removed by sliding it longitudinally of bar 20b. The blade is only frictionally engaged between flange 22b and bar end portion 21b. If desired, screws 64 can be loosened slightly to facilitate sliding out the blade. The blade will be discarded if it is dull, nicked or broken and can be quickly replaced by another one.

FIGS. 8 and 8A show an assembly 10C of rotary mower bar 20c and blade 25c. Flange 22c is turned under at each end of the bar to define a space 23c. A diagonal slot 75 is formed in end portion 21c of the bar and a hole 76 is spaced a short distance from the slot. Blade 25c has a cutting edge 80. A flange 82 extends out of the back of the blade. On flange 82 are two studs 84, 85. Flange 22c is narrower than the end portion 21c of bar 20c and is flexible. Stud 84 can slide into diagonal slot 75 while stud 85 can slide under the end portion of the bar to snap into hole 76. A diagonal groove 86 can be formed on the inner side of end portion 21c of the bar to facilitate engaging stud 85 in hole 76. During operation the bar turns in the direction of arrow 87 so that blades 25c mow the vegetation presented to them.

In FIG. 9, flange 22d at end portion 21d of bar 20d in assembly 10D, is rectangular and defines a rectangular channel 23d. Blade 25d has cutting edges 88a, 88b at opposite edges. Shank or back 90 of the blade is rectangular, and has a hole 92. The shank of screw 94 extends through a hole in flange 22d, hole 92 on shank 90 and threaded hole 96 in end portion 21d of the bar. As indicated by dotted lines in FIGS. 9 and by arrow 97, the blade can be reversed in position.

FIG. 10 shows assembly 10E of rotary motor bar 20e and blade 25d. The blade is constructed the same as shown in FIG. 9. Flange 22e is rectangular and defines rectangular passage 23e to receive shank 90. The flange is bent so that its sides are 45° to the plane of end portion 21e of bar 20e. The shank of screw 94 will extend through hole 95 in flange 22e and will be engaged in threaded hole 96' in side 98 of flange 22e.

FIG. 11 and FIG. 11A show assembly 10F of rotary mower bar 20f and blade 25f. A semicircular flange 22f is turned under end portion 21f of the bar. Shank or back 100 of the blade is semi-cylindrical and slides into passage 23f. Screw 102 extends through hole 104 in end portion 21f, hole 106 in shank 100 and threaded hole 108 in flange 22f. A cutting edge 107 is formed at the outer edge of knife 112 which is perpendicular to back 100.

FIG. 12 shows assembly 10G of rotary mower blade 20g and blade 25g. Flange 22g has one side 110 bent 60° to end portion 21g of the bar and inner side 112 bent 60° to side 110. This defines a triangular passage 23g which receives triangular shank 114 of blade 25g. Screw 116 extends through hole 118 in flange 22g, hole 120 in shank 114 and threaded hole 122 in end portion 21g of the bar. Cutting edge 124 is formed at the outer edge of knife bar 125 which is disposed at a right angle to shank 114.

FIG. 13 shows assembly 10H in which rotary mower bar 20h has a flange 22h at its end 21h. The flange is formed as a flattened tapered loop with an end opening 128. Blade 25h has cutting edges 130 at opposite edges. The shank or back 132 of the blade is tapered in form to fit into flange 22h. Screw 134 extends through aligned holes 135 in the flange and bar end portion 21h and through hole 136 in shank 132.

FIG. 14 is turned upwardly at end portion 21j of the bar and is formed with a rectangular hole 138. Cutting edges 140 are formed at opposite edges of knife 142. Rectangular shank portion 144 fits in rectangular hole 138. Bar 146 at the end of the blade engages in space 23j under flange 22j. Screws 148, 149 engage in holes 150 formed in the flange and extend through holes 152 in bar 146. The screws engage in holes 154 in end portion 21j of bar 20j.

FIGS. 15 and 16 show assemblies 10K, 10M, 10N on rotary mower disk 160. Rotary bars 20k, 20m and 20n mount on disk 160. Flanges 22k, 22m and 22n are turned under the respective bars to define spaces which receive backs of blades 25k, 25m and 25a. In bar 20k studs 170 back up blade 25k. Stud 172 engages projection 174 at one end of blade 25k. Edge 175 is beveled to define a cutting edge. A notch 176 at the other end of the blade engages screw 180 which extends through hole 179 in the flange and is secured in threaded hole 181 in bar end portion 21k.

Blade 25a in assembly 10N is identical to that shown in FIG. 3 and fits into opposing channels defined by bent edges 198 of flange 22n and bar 20n.

Bars 20k, 20m and 20n all have holes 195 which receive bolts to secure them to disk 160. The bolts extend through holes 196 in the disk and in turn are secured by nuts 197. The blades 25a, 25k and 25m can all be easily removed and replaced with others.

In all the forms of the invention shown in FIGS. 1 through 8, the blades are mounted on the leading edges of the rotary bars in the direction of rotation of the bars. This means that the blades face in opposite directions at opposite ends of the bars as shown in FIG. 2. Only one end of the rotary bar has been shown in FIGS. 3, 6, 8 –13 because the other end of the bar is identically formed. The flanges in all rotary bars except bar 20h are bent on axes transverse to the longitudinal axes of the bars.

FIG. 17 shows a flat bar 200 at one stage in the processes of forming blade holder bar 20p of FIG. 19. The elongated rectangular bar has a central hole 39 to engage on the shaft 14 of motor 16 as explained in connection with FIGS. 1 and 2. A rectangular cut-out 201 is formed at each end of the bar. The cut-outs are made at the corners and extend inwardly from opposite edges 202, 204. This leaves a rectangular tab 206 at each end which is wider transversely of the bar than the cut-out. Each tab is folded inwardly on transverse lines 208, 210 to abut the bar as clearly shown in FIG. 18, and the folded tabs are secured by spot welds 211 to the bar. The ends of the bar are then folded over again on transverse lines 212, 214. A rectangular recess 215 is formed between each of flanges 216, 218 and the body of the bar. The recess extends inwardly as far as tab 206. The folded edges 208, 210 can be secured by welds if desired. A hole 222 is formed in each of flanges 216, 218. The tabs 206 serve as spacers. The recesses 215 receive the back portions of blades such as blade 25p shown in FIG. 23. This blade has a hole 226 which registers with hole 222 and a further hole 228 formed in the bar. The free marginal portion 229 of each flange 216 and 218 can be bent on line 230 toward the body of the bar 20p as clearly shown in FIGS. 19, 20 and 22 to conform to the slant of the wedge shaped blade. The back of the blade will be inserted into recess 215 and then bolt 232 will be inserted through holes 222, 226, 228. A lockwasher 234 can be provided on the bolt at the bottom of the bar and another lockwasher 236 can be provided at the top of the bar. Then nut 238 will be engaged on the bolt to secure the blade securely in place as shown in FIGS. 20 and 22. When the nut is tightened the free flexible marginal portion 229 will be forced snugly against the top of the blade. Removal of the blade can easily be accomplished simply by removing the nut and bolt to release the blade.

FIG. 24 shows another blade holder 29q having double folded bar 200'. In this construction, tab 240 is folded up and over on top of flange 242 which is folded over the bar. Similar double folds are provided at each end of the bar. Registering holes 244 are formed in the bar, flange and tab to receive bolt 246. The shank of the bolt will pass through hole 248 in blade 25q. A nut and lockwashers as shown in FIG. 22 can then be secured on the bolt. Alternatively the hole 244 in tab 240 can be threaded to engage the bolt.

FIGS. 25—27 show another blade holder 20r which receives blade 25q. The flat bar 250 has a folded flange 252 at each end defining a tapered recess 253 into which the back 254 of the blade easily slides. A spacer plate 256 may be secured by weld 258 between the flange and body of the bar. The spacer can be a folded tab as in holder 25p. Bolt 260 is then inserted through registering holes 262 in the flange and bar and hole 248 in the blade and secured by nut 238 and lockwasher 236.

FIG. 28 shows another blade holder 20s in which flange 270 is folded over bar 272 to define a recess 274 into which a blade such as blade 25q or any other of the blades previously described can be inserted. A movable collar 280 slides laterally as indicated by arrow 282 to force flange 270 securely against the blade. Edge 283 of the flange can be beveled to facilitate sliding the collar over the flange.

FIGS. 29 and 30 show a further blade holder 20t in which flange 290 of bar 291 is longer than blade 25t. The bar may have a nut 294 welded thereon or it may have a threaded hole which registers with hole 295 in the free flexible end portion 292 of the flange. The shank of bolt 296 is inserted through the hole in the flange and engages securely with the nut. A lockwasher 298 can be provided on the bolt. The flexible end portion 292 of the flange presses against the blade to hold it in place. The blade remains in place during operation since pressure against the cutting edge of the blade by grass and other vegetation cut by the blade will tend to force the blade more tightly into the holder.

In all forms of the invention, the blade can be easily and quickly removed without disassembling the rotary mower bar from the shaft of the driving motor. The blades are expandable. They can be discarded when they become worn or broken.

I claim:

1. A blade and holder assembly for a power driven rotary mower having a motor with an axially vertical drive shaft, comprising a bar having a central hole for attachment to the shaft of a motor so as to rotate in a horizontal plane about the axis of said shaft; a flange at each end of the bar bent to define a space with a continuous adjacent end portion of the bar; a pair of blades, each blade being a solid body, generally trapozoidally shaped in cross section and only having a cutting edge and a back, said back fitting into said space between one flange and one end portion of the bar and means for removably retaining the blades at opposite ends of the bar, said flange and end portion of the bar being spaced apart; a spacer disposed between the flange and end portion of the bar and serving as an abutment for the back of the blade; said flange and end portion of the bar being further formed with aligned holes; screws extending through holes in said spacer and engaged in said aligned holes in the flange and end portion of the bar; and the retaining means including opposingly spaced bent edges of said flange and end portion of the bar, said opposing edges defining opposing channels, said back of the blade being grooved to fit slidably into said channels with the blade extending forwardly from between said edges.

* * * * *